United States Patent
McGlasson et al.

(10) Patent No.: US 7,836,803 B2
(45) Date of Patent: Nov. 23, 2010

(54) QUICK-ADJUST DRAW ROD POSITIONING NUT

(75) Inventors: William D. McGlasson, Caledonia, NY (US); Kenneth E. Glasow, Spencerport, NY (US)

(73) Assignee: The Gleason Works, Rochester, NY (US)

( * ) Notice: Subject to any disclaimer, the term of this patent is extended or adjusted under 35 U.S.C. 154(b) by 414 days.

(21) Appl. No.: 12/082,729

(22) Filed: Apr. 14, 2008

(65) Prior Publication Data

US 2008/0279623 A1 Nov. 13, 2008

Related U.S. Application Data

(60) Provisional application No. 60/927,969, filed on May 7, 2007.

(51) Int. Cl.
*B23B 13/12* (2006.01)
*B23B 13/00* (2006.01)

(52) U.S. Cl. .......................................... 82/155; 82/152

(58) Field of Classification Search .................. 82/155, 82/152, 153, 164, 170, 168; 279/156; 409/233
See application file for complete search history.

(56) References Cited

U.S. PATENT DOCUMENTS

| | | | | |
|---|---|---|---|---|
| 2,608,253 A | * | 8/1952 | Battles et al. | 100/257 |
| 3,025,646 A | * | 3/1962 | Thompson | 451/5 |
| 3,032,347 A | * | 5/1962 | Cambron | 279/156 |
| 3,083,976 A | | 4/1963 | Stark | |
| 3,124,025 A | * | 3/1964 | Bohnet | 82/153 |
| 3,244,427 A | | 4/1966 | Taschl | |
| 3,385,607 A | * | 5/1968 | Hughes | 279/51 |
| 3,517,939 A | | 6/1970 | Jaehn | |
| 3,718,339 A | * | 2/1973 | Dunham et al. | 279/51 |
| 3,735,994 A | | 5/1973 | Jaehn | |
| 3,874,688 A | | 4/1975 | Schiller | |
| 5,639,194 A | | 6/1997 | Harroun | |
| 6,260,855 B1 | | 7/2001 | Curtis | |

OTHER PUBLICATIONS

International Search Report and Written Opinion for PCT/US2008/004823.

* cited by examiner

*Primary Examiner*—Will Fridie, Jr.
(74) *Attorney, Agent, or Firm*—Robert L. McDowell

(57) ABSTRACT

A quick-adjust draw rod positioning nut which is attachable to a machine's chuck and/or de-chuck prime mover via a base portion. The positioning nut includes an engagement portion preferably comprising at least two segments that can be held in a collapsed position, where the segments threadably engage a draw rod, or an expanded position, where the segments are out of engagement with the draw rod, depending on the presence or positioning of a ring. In the collapsed position, the engagement portion can be disengaged from the base to permit rotation of the engagement portion and thereby effecting axial movement of the draw rod in order to achieve proper axial positioning of the draw rod in the machine. The engagement portion can be locked in one of a plurality of incrementally spaced rotational positions to adjust the axial position of the draw rod to a desired position.

17 Claims, 7 Drawing Sheets

QUICK-ADJUST DRAW ROD POSITIONING NUT

This application claims the benefit of U.S. Provisional Patent Application No. 60/927,969 filed May 7, 2007.

FIELD OF THE INVENTION

The present invention is directed to a means to adjust the position of a draw rod of a machine tool, preferably gear manufacturing and testing machines. Specifically, the adjusting means comprises a draw rod nut having at least two segments.

BACKGROUND OF THE INVENTION

In metalworking and/or testing operations, particularly gear manufacturing and testing, where a workpiece is machined, equipment of some type is necessary to hold the workpiece in position in a machine tool so the machining and/or testing process can be successfully carried out. This type of equipment is known as "workholding" equipment. In the production of toothed articles, such as gears, workholding equipment can be generally categorized as two types, chucks and arbors.

Chucks hold a workpiece by contracting a component called a "collet" around the workpiece or a component thereof. For example, when a bevel or hypoid pinion with integral shaft is placed in a chuck, it is usually the shaft that is gripped by the collet which has been reduced in diameter to grip the shaft to hold the pinion in position. Examples of chucks for gripping pinion shanks can be found in U.S. Pat. No. 3,083,976 to Stark; U.S. Pat. No. 3,244,427 to Taschl; or U.S. Pat. No. 6,260,855 to Curtis.

Arbors grip a workpiece by expanding a collet into contact with a surface of the workpiece. As an example, a bevel ring gear is placed on an arbor and the collet is expanded until contact of sufficient force is established with the surface of the bore of the ring gear to hold the ring gear in position during machining. An example of an arbor for a ring gear can be found in U.S. Pat. No. 3,735,994 to Jaehn. An arbor for expanding into contact with the bore of a pinion can be found in U.S. Pat. No. 3,517,939 to Jaehn.

In either chucks or arbors, the force necessary to contract or expand the collet mechanism is provided by a draw rod in the machine tool. The draw rod is advanced and/or retracted usually via a hydraulically operated piston or sleeve attached to an end of the draw rod opposite the end communicating with the workholding mechanism. In general, movement of the draw rod in the axial direction of the chuck or arbor usually causes opposed angled surfaces of components within the workholding equipment to slide relative to one another resulting in inward (contracting) or outward (expanding) movement of the collet as is necessary to grip or release a respective workpiece or component part thereof. Generally, one angled surface is found on the collet and the other angled surface is found on an actuator attached to the draw rod or on the draw rod itself.

At times, it may be necessary to adjust the position of the draw rod in the direction of the workpiece axis such as, for example, when a workpiece of different geometry is machined, workholding equipment of a different design or dimensions is installed or a different machining tool is utilized. Draw rods are commonly positioned via a nut that is turned in one direction or another on a threaded end portion of the draw rod to axially locate the draw rod at a desired position. Known solutions typically employ a double nut, a first nut part that controls draw rod positioning, and a second nut part that traps or jams against the first to prevent it from loosening or moving. Typically two wrenches are required to adjust such an apparatus and it can be susceptible to loosening over time.

An object of the present invention is the accurate, quick adjustment without tools of machine draw rod positions for proper operation of workholding fixtures. The inventive apparatus applies to gear-production machinery such as testers, lappers, cutting and grinding machines, as well as to any machine that uses draw-rod-operated workholding fixtures. Use of this device saves cycle time for tooling changeovers, allows controlled draw-rod adjustments in fine increments, enables gross adjustments and/or exchange of a draw rod, and cannot come loose during operation.

SUMMARY OF THE INVENTION

The present invention comprises a quick-adjust draw rod positioning nut which is attachable to a machine's chuck and/or de-chuck prime mover via a base portion. The positioning nut further includes an engagement portion preferably comprising at least two segments that can be held in a collapsed position, where the segments threadably engage a draw rod, or an expanded position, where the segments are out of engagement with the draw rod, depending on the presence or positioning of a ring. In the collapsed position, the engagement portion can be disengaged from the base to permit rotation of the engagement portion and thereby effecting axial movement of the draw rod in order to achieve proper axial positioning of the draw rod in the machine. The engagement portion can be locked in one of a plurality of incrementally spaced rotational positions to adjust the axial position of the draw rod to a desired position.

DETAILED DESCRIPTION OF THE PREFERRED EMBODIMENTS

The details of the present invention will be discussed with reference to the accompanying Figures which are intended to illustrate the invention by way of non-limiting example only.

The quick-adjust draw rod positioning nut 2 disclosed herein attaches to a machine's chuck and/or dechuck prime mover 6. This is the machine part that strokes back and forth to effect clamping (chucking) and/or unclamping (dechucking) of work-pieces or tools via a draw rod. The prime mover 6 can be moved by various well-known means such as mechanical spring packs, hydraulic or pneumatic cylinders, powered ball-screws, etc. The draw rod nut is typically located at the rear of a spindle where it is accessible to the operator.

The workholding fixtures (chuck, arbors) installed in the machine are not directly connected to the prime mover 6 but are connected by an intermediate machine draw rod 24 that can be adjustably connected to the prime mover 6. Proper operation (clamp and release action) of workholding fixtures depends on the proper positioning and stroke of the draw rod 24. A draw rod nut is the element that provides the adjustable link between a prime mover and a draw rod.

Figure 1:
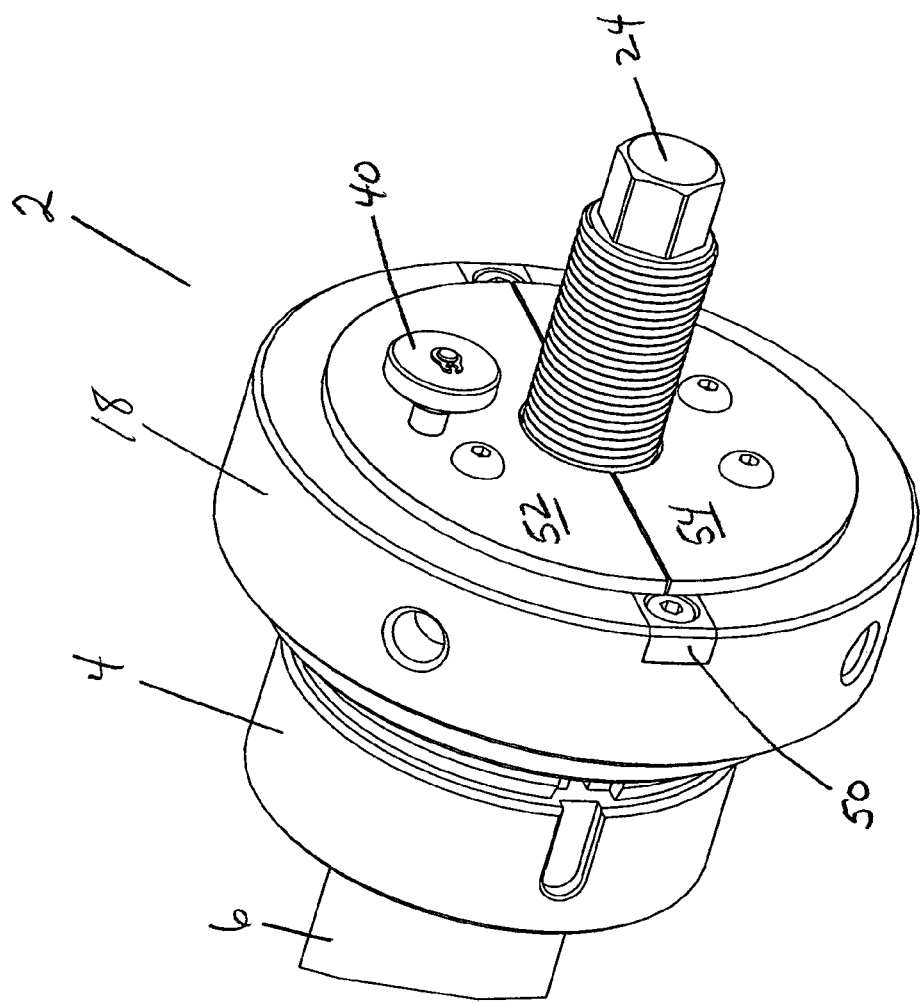
FIG. 1 is a front perspective view of the draw rod positioning nut in the collapsed position.
Figure 3:
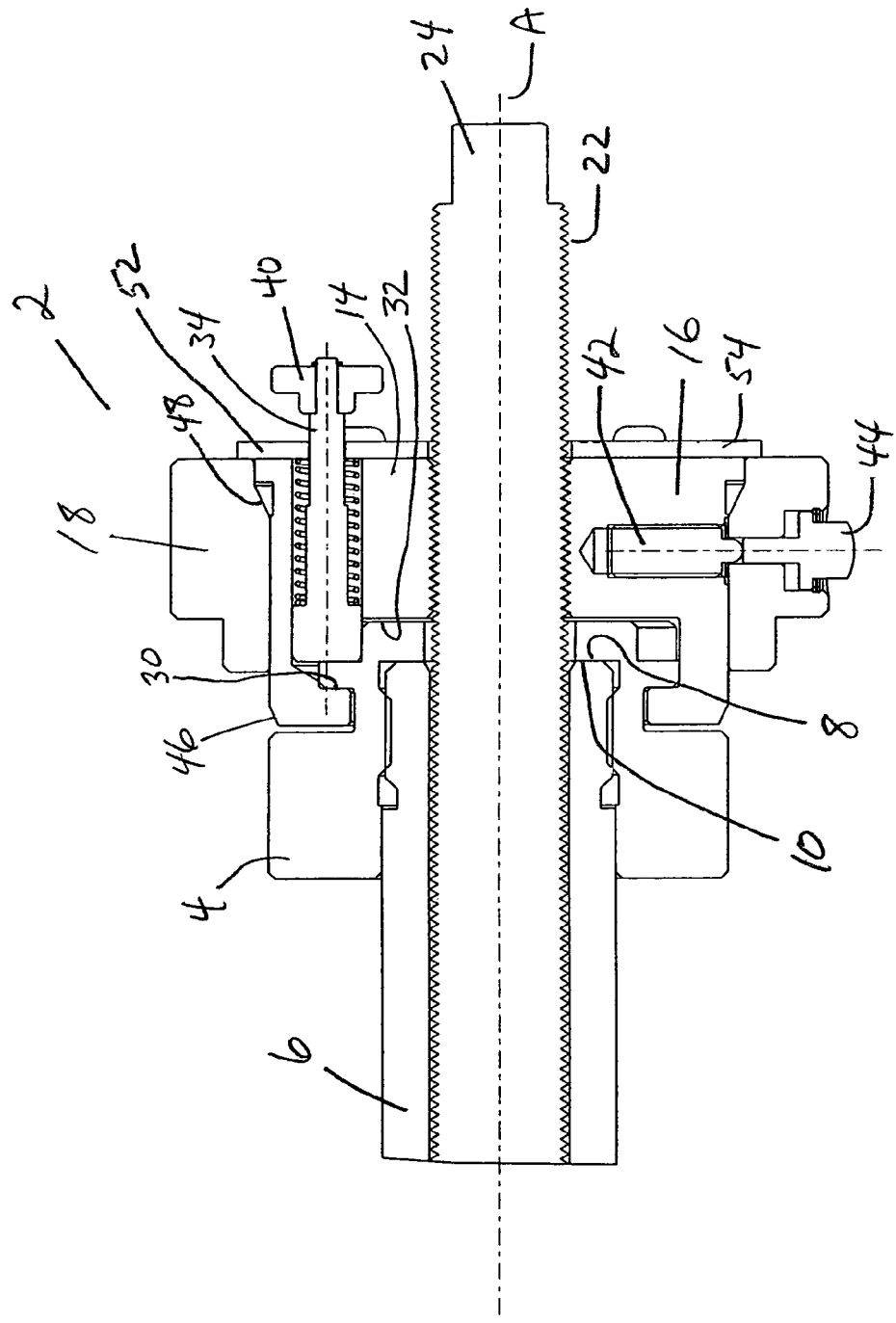
FIG. 3 is a cross-sectional view of the inventive draw rod positioning nut with the nut segments in the collapsed position.

In FIG. 1, the inventive positioning nut 2 consists of a base portion 4 that is removably attached to a prime mover 6 (only a portion shown). Preferably, the base portion 4 is threaded onto the prime mover 6 until a shoulder 8 (FIG. 3) of the base portion 4 is seated against a shoulder 10 of the prime mover 6. The particular type of structure or operation of the prime mover is not a subject of the present invention and as such, no further details and discussion are believed necessary. The principle aspect is that the base portion 4 of the positioning nut 2 be connectable, in some manner, to the prime mover 6.

Figure 2:
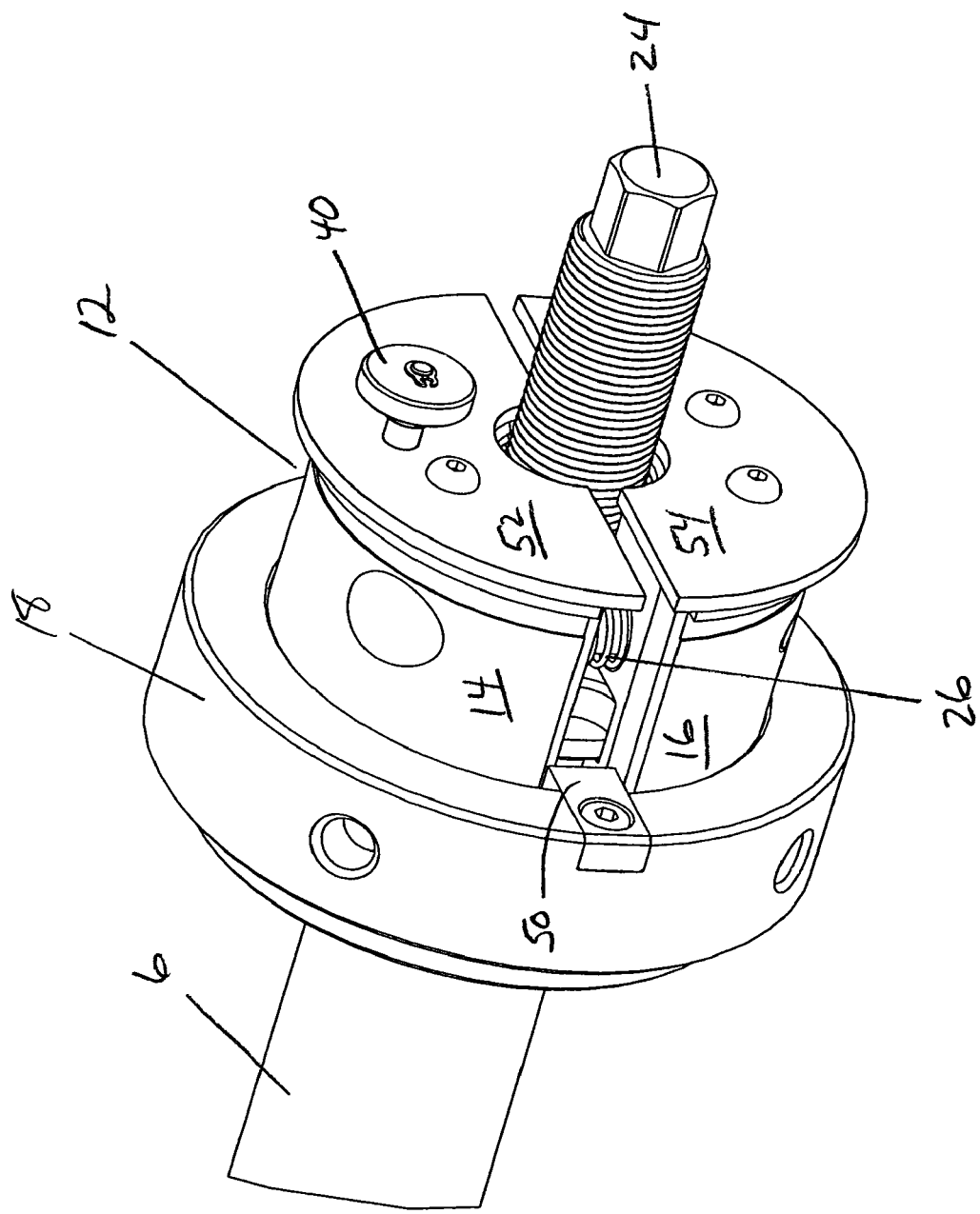
FIG. 2 is a front perspective view of the draw rod positioning nut in the expanded position.

FIG. 2 shows the positioning nut 2 further includes an engagement portion 12 preferably comprising two segments 14 and 16 (more than two segments are also contemplated). The segments 14, 16 can be held in the collapsed position (FIG. 1 where they are hidden, or FIG. 3) or the expanded position (FIGS. 2 or 4) depending on the presence or positioning of closure ring 18. The segments 14, 16 preferably have female threads 20 (FIG. 4) to engage male threads 22 of a machine draw rod 24 when collapsed (FIG. 3) by the rearward positioning (to the right in FIG. 3) of ring 18. Upon forward movement of the ring 18 (to the left in FIG. 3), the segments 14, 16 separate from one another thereby expanding the engagement portion 12 and as such, the threads 20 separate from and clear the draw rod threads 22. Springs 26 are provided to cause the nut segments 14, 16 to separate (expand) whenever the ring 18 position allows.

The nut segments 14, 16 engage a flange 28 on base portion 4 so that they are trapped by surfaces of 30, 32 of base portion 4 (FIG. 3) and can transmit both pull and push forces from the prime mover 6. The engagement portion 12 can be rotated relative to the base portion 4 but cannot be moved axially beyond some small clearance value.

The present invention further includes a lock pin 34 (FIGS. 3-7) housed in one of the segments 14, 16 (14 shown) and a spring 36 which causes the lock pin 34 to move forward and be inserted into one of a plurality of complimentary-shaped pockets or targets 38 of the base 4. The targets 38 on the base piece 4 provide locking positions into which the lock pin 34 extends. These targets can be a bore or portion of a bore and one or more are distributed around the base circumference. The number of the targets (twelve, for example) becomes the number of adjustment positions available for each turn of the draw rod engagement portion 12.

Figure 5:
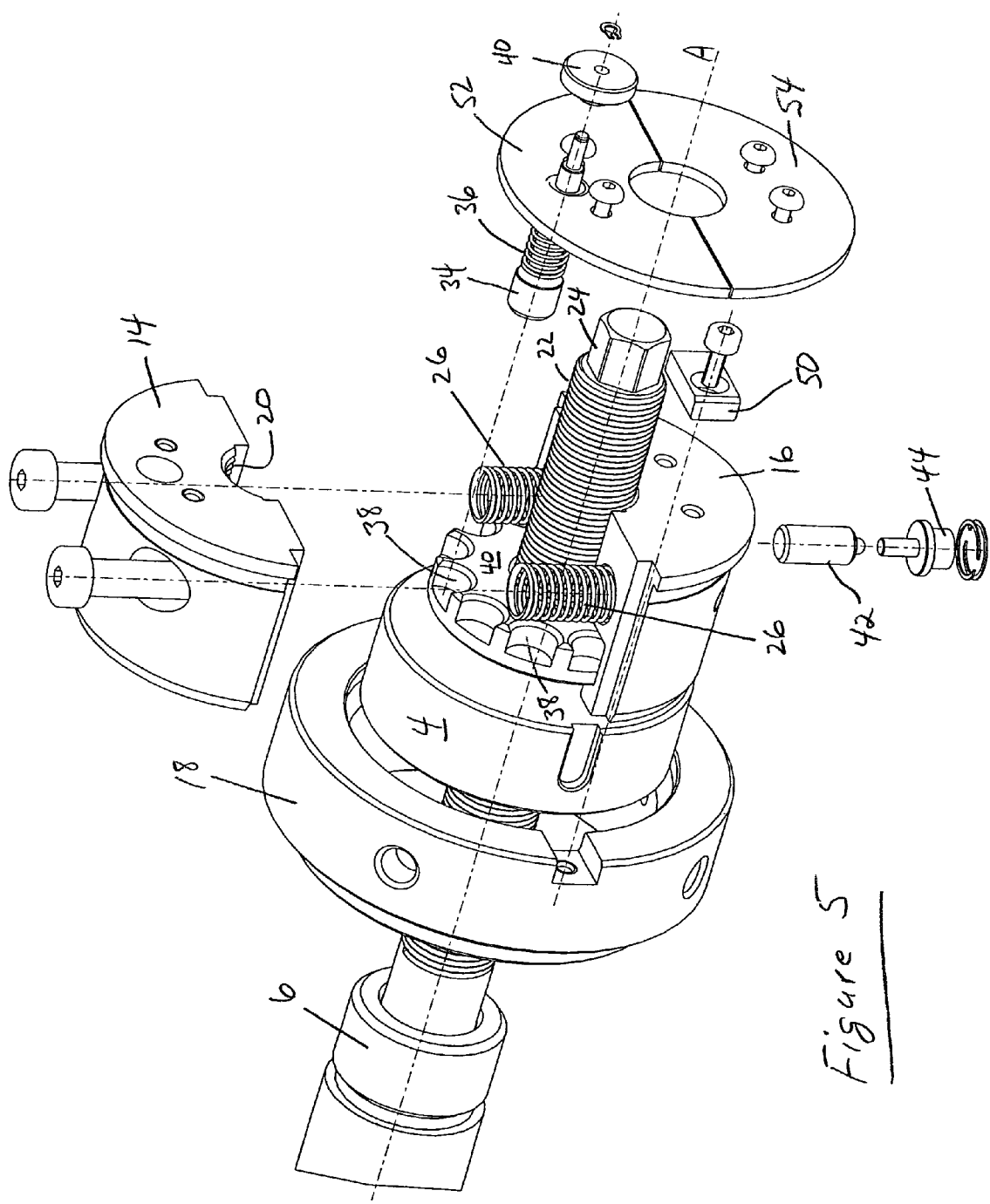
FIG. 5 is an exploded view of the draw rod positioning nut showing the bottom nut segment in the collapsed position.
Figure 6:
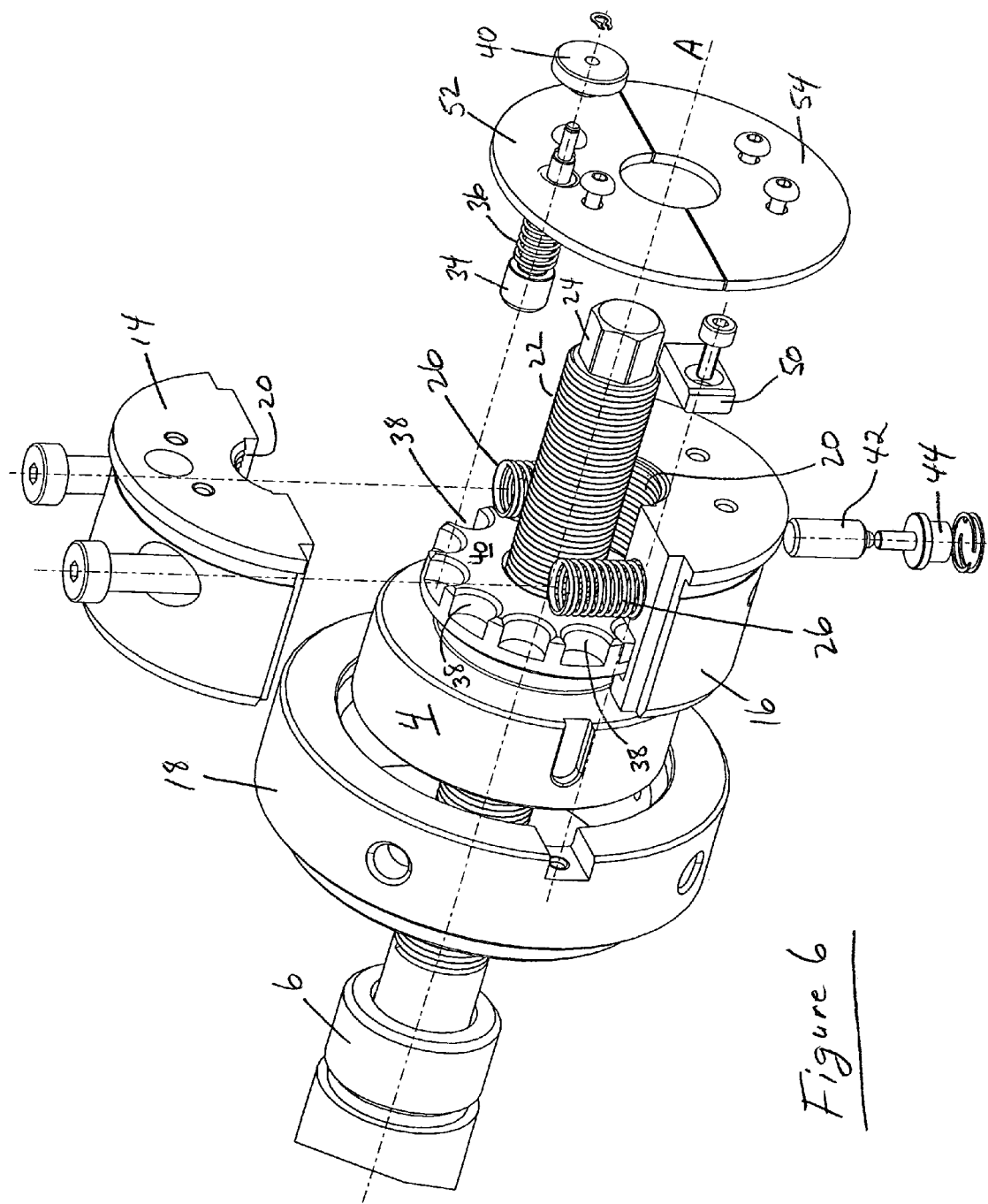
FIG. 6 is an exploded view of the draw rod positioning nut showing the bottom nut segment in the expanded position.

Preferably, the targets 38 are arranged as a generally sprocket-shaped element 40 (FIGS. 5 and 6) positioned integral with, or fashioned as part of, the base 4. It is further preferable that the targets 38 are located spaced equidistantly about the axis A of the positioning nut 2 (which is coincident with the axis of the draw rod 24). For example, twelve targets 38 may be spaced at 30° intervals about the axis A. While the preferred shape of the target features 38 is semi-circular as shown in FIGS. 5 and 6, other shapes that accept the shape the lock pin 34, such as circular, are contemplated. Furthermore, the cross-sectional shape of the lock pin 34 may be other than circular and as such, the complementary shape of the targets 38 would likewise depart from circular. However, it should be noted that the targets 38 need to be dimensioned such as to allow for movement of the lock pin 34 upon expansion of the nut segments 14,16. Given this, the preferable form of targets 38 is one that comprises an opening in the radial direction, with respect to axis A, such as the semi-circular shape of the targets 38 shown in FIGS. 5 and 6.

Figure 7:
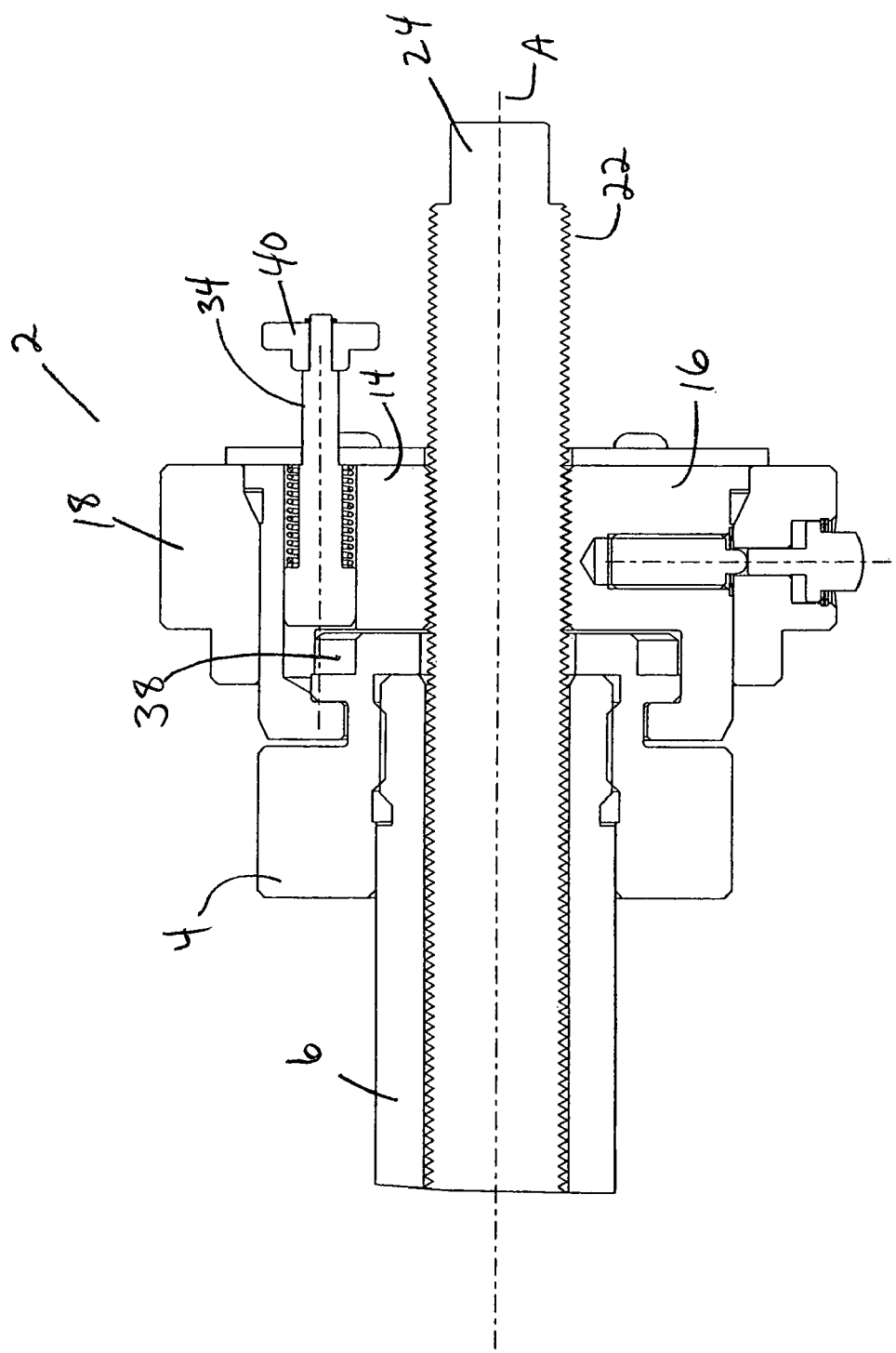
FIG. 7 is a cross-sectional view of the inventive draw rod positioning nut with the nut segments in the collapsed position and the lock pin disengaged.

Once lock pin 34 is inserted into a target (FIG. 3 for example), the engagement portion 12 (i.e. nut segments 14, 16) cannot be rotated relative to the base 4. A knob 40 is preferably included to allow an operator to pull the lock pin 34 out of a target 38 thereby unlocking it from the base 4 (FIG. 7). When disengaged, the engagement portion 12 is free to rotate again.

When the engagement portion 12 is rotated with the nut segments 14, 16 collapsed (i.e. threads 20, 22 engaged), the draw rod 24 is moved in or out along axis A according to the thread and the direction of rotation, and, therefore, the desired draw rod position can be obtained. Once the draw rod 24 is in position, the lock pin 34 is allowed to lock into the nearest target 38 and the draw rod position becomes fixed for production use. The distance the draw rod 24 moves as the lock pin 34 engages successive targets 38 becomes the minimum adjustment increment of the draw rod 24. For example, a rotational increment of 30° from one target 38 to the next successive target may effect a respective axial movement increment of 0.005 inch (0.127 mm) of the draw rod 24. The lock pin 34 provides an accurate, positive means to achieve controllable no-tools draw rod adjustments.

It is to be understood the present invention contemplates locking mechanisms other than the preferred lock pin and target arrangement discussed above provided the axial incremental adjustability of the draw rod is maintained. For example, a socket may be located in place of the pin 34 and pins may replace the targets 38. A spring-loaded pin type element, such as lock pin 34, may be insertable between spaced projections emanating from the base portion 4. Alternatively, a radially movable element (e.g. a plunger) may drop between spaced slots in the base portion 4. Additionally, the outer end surfaces of the pin 34 and targets 38 may be chamfered or tapered to permit the pin to more easily enter into target in those instances where a pin is not directly lined-up with a target.

Figure 4:
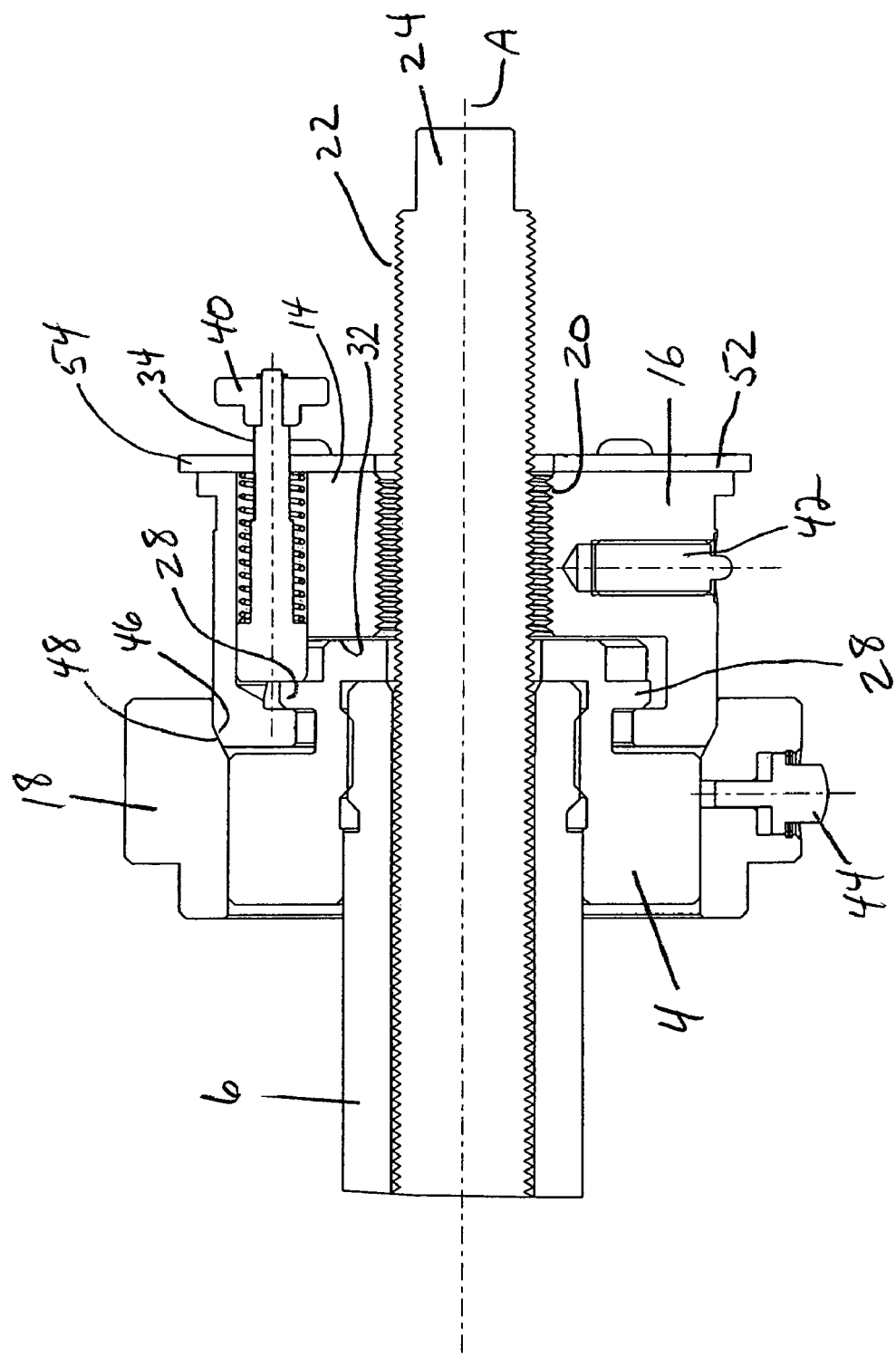
FIG. 4 is a cross-sectional view of the inventive draw rod positioning nut with the nut segments in the expanded position.

The ring 18 is moveable axially to collapse the nut segments 14,16 to operating position (FIG. 3) or allow the nut segments to expand for the clearance or set-up position (FIG. 4). The ring is pushed forward to allow expansion, and pulled back to collapse the nut segments 14,16. Preferably, a spring-plunger 42 prevents the ring from moving axially from the production (nut segments collapsed) position unless a button 44 is pressed by the operator. Ramping or conical features 46, 48 on the nut segments and ring, respectively, (FIGS. 3 and 4) allow the axial motion of the ring 18 to effect the collapse or expansion. One or more keys 50 are preferably provided that allow axial motion of the ring 18 relative to the nut segments 14, 16 but prevent rotational motion between them.

The outer surface of the ring 18 is typically knurled so that an operator can make rotational adjustments of the engagement portion 12 by turning the ring 18 by hand. In the expanded position (FIG. 4), the ring 18 helps locate the nut segments 14,16 so that they are properly positioned and clear of the draw rod threads 22. The female threads 20 of the nut segments 14, 16 can be additionally relieved in areas to assist in clearing the male threads without increasing separation distance.

When the nut segments 14, 16 are expanded, the draw rod 24 is completely free to be moved axially without contact with the nut segments. In this position, tooling changeovers that require removal and installation of draw rods can be accomplished without the conventional task of unthreading traditional nuts from a potentially long length of draw rod thread.

A front plate or plate segments 52, 54 help protect the nut segments 14, 16, respectively, from contamination, provide a retaining function for the spring lock pin 34 parts, and can be marked with operating instructions, such as the axial travel distance of the draw rod 24 per incremental rotation of the engagement portion 2 or the direction of draw rod movement per a given rotational direction of the engagement portion 2.

For many tooling styles (e.g. draw rod threads onto an arbor) the following procedures can be used:

A. To remove arbor:
1) put spindle/arbor in dechuck state;
2) open nut segments 14,16;
3) from back, turn draw rod 24 off arbor threads;
4) remove arbor from spindle front;
5) remove draw rod (if desired) by pulling out from spindle front.

B. To install arbor:
1) put spindle in dechuck state;
2) open nut segments 14,16;
3) insert machine draw rod (if removed) from front and push to back;
4) install arbor from spindle front;
5) push draw rod to front and thread onto arbor;
6) collapse nut segments 14,16;
7) make final adjustments (with lock pin 34 disengaged from targets 38) via rotation of ring 18 and engagement portion 12 until final axial position of draw rod 24 is achieved;
8) insert lock pin 34 into nearest target 38.

Note that for some tooling styles, the draw rod is not threaded onto the workholding equipment, but is engaged by means of a bayonet or other similar interface. In these cases, the workholding equipment is engaged/disengaged from the draw rod with a limited rotation of the arbor (for example, 60 degrees) during installation or removal and the nut segments 14, 16 can remain closed. Additionally, in some cases the draw rod and nut may need no adjustment at all during tooling changes if their proper position is common for many workholding units to be used.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A draw rod positioning nut attachable to a machine tool, said positioning nut comprising:
    a base portion having an axis,
    an engagement portion engaged with said base portion, said engagement portion comprising at least two segments, said at least two segments being positionable with respect to one another in a collapsed position wherein said segments engage a machine draw rod, and in an expanded position wherein said segments are out of engagement with a draw rod,
    a movable ring located on said positioning nut, said ring being movable between a first position in contact with said segments to maintain said segments in the collapsed position and a second position remote from said segments whereby said segments attain the expanded position,
    wherein in the collapsed position, said engagement portion is rotationally releasable relative to said base portion thereby permitting rotation of the engagement portion and thus effecting an axial movement of the draw rod for selectively positioning the draw rod in a desired axial position in the machine, said engagement portion being rotationally lockable in one of a plurality of incrementally spaced rotational positions to maintain said draw rod in said desired axial position.

2. The positioning nut of claim 1 wherein said plurality of incrementally spaced rotational positions comprises a generally sprocket-shaped element integral with said base wherein the sprocket-shaped element defines a plurality of target elements spaced thereabout.

3. The positioning nut of claim 2 wherein said target elements are semi-circular shaped and open in a radially outward direction.

4. The positioning nut of claim 2 wherein said plurality of target elements are equidistantly spaced about said sprocket-shaped element.

5. The positioning nut of claim 2 wherein the engagement portion comprises a locking pin movable to engage and disengage with a target element.

6. The positioning nut of claim 5 wherein said locking pin and said target elements are complementary shaped.

7. The positioning nut of claim 5 wherein outer surfaces of said locking pin and said target elements are chamfered or tapered.

8. The positioning nut of claim 1 wherein said at least two segments include a threaded inner surface so as to threadably engage a machine draw rod when said at least two segments are collapsed.

9. The positioning nut of claim 1 further comprising a plunger located in said engagement portion with said plunger being insertable into a recess in said ring when said segments are in the collapsed position thereby preventing unintended movement of said ring from the first position.

10. The positioning nut of claim 9 further comprising a button in said ring aligned with said recess, said button capable of being advanced so as to urge said plunger from said recess thereby permitting movement of said ring to the second position.

11. The positioning nut of claim 1 further comprising ramping surfaces on said ring and said segments, the ramping surface of said ring and the ramping surface of said segments being in contact with one another when said ring is in said second position.

12. The positioning nut of claim 1 wherein said segments are urged away from one another to said expanded position by a plurality of springs.

13. The positioning nut of claim 1 wherein said plurality of incrementally spaced rotational positions comprises a plurality of pins integral with said base and spaced about said axis and wherein the engagement portion comprises a socket for receiving one of said pins for maintaining said draw rod in said desired axial position.

14. The positioning nut of claim 1 wherein said plurality of incrementally spaced rotational positions comprises a plurality of spaced projections emanating from the base portion toward a spring-loaded pin element on said engagement portion.

15. A machine tool having a draw rod with a draw rod nut thereon, said draw rod nut comprising:
a base portion having an axis,
an engagement portion connected to said base portion, said engagement portion comprising at least two segments, said at least two segments being positionable with respect to one another in a collapsed position wherein said segments engage a machine draw rod, and in an expanded position wherein said segments are out of engagement with a draw rod,
a movable ring located on said positioning nut, said ring being movable between a first position in contact with said segments to maintain said segments in the collapsed position and a second position remote from said segments whereby said segments attain the expanded position,
wherein in the collapsed position, said engagement portion is rotationally releasable relative to said base portion thereby permitting rotation of the engagement portion and thus effecting an axial movement of the draw rod for selectively positioning the draw rod in a desired axial position in the machine, said engagement portion being rotationally lockable in one of a plurality of incrementally spaced rotational positions to maintain said draw rod in said desired axial position.

16. The machine tool of claim 15 being a gear manufacturing or testing machine.

17. The machine tool of claim 15 wherein said draw rod is connected to a chuck or arbor.

* * * * *